United States Patent
Tsuguma et al.

(10) Patent No.: US 10,384,656 B2
(45) Date of Patent: Aug. 20, 2019

(54) VEHICLE OPERATION PEDAL DEVICE

(71) Applicants: TOYODA IRON WORKS CO., LTD., Toyota-shi, Aichi (JP); TOYOTA JIDOSHA KABUSHIKI KAISHA, Toyota-shi, Aichi (JP)

(72) Inventors: Tomohiro Tsuguma, Nissin (JP); Hiroaki Tsuzuki, Toyota (JP); Shuji Nakamura, Toyota (JP); Hirotaka Shinada, Toyota (JP)

(73) Assignees: TOYODA IRON WORKS CO., LTD., Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/746,168

(22) PCT Filed: Jun. 17, 2016

(86) PCT No.: PCT/JP2016/068077
§ 371 (c)(1),
(2) Date: May 31, 2018

(87) PCT Pub. No.: WO2017/043144
PCT Pub. Date: Mar. 16, 2017

(65) Prior Publication Data
US 2018/0281756 A1 Oct. 4, 2018

(30) Foreign Application Priority Data

Sep. 7, 2015 (JP) .................................. 2015-175330

(51) Int. Cl.
B60T 7/06 (2006.01)
G05G 1/327 (2008.04)
G05G 1/30 (2008.04)

(52) U.S. Cl.
CPC ................. B60T 7/06 (2013.01); B60T 7/065 (2013.01); G05G 1/30 (2013.01); G05G 1/327 (2013.01)

(58) Field of Classification Search
CPC ............ G05G 1/30; G05G 1/32; G05G 1/327; G05G 1/46; G05G 1/38; B60T 7/06; B60T 7/065; Y10T 74/20528
See application file for complete search history.

(56) References Cited

U.S. PATENT DOCUMENTS

| | | | | |
|---|---|---|---|---|
| 5,615,749 A | * | 4/1997 | Kato ....................... | B60R 21/09 180/274 |
| 6,701,800 B2 | * | 3/2004 | Saitou .................... | B60R 21/09 180/274 |

(Continued)

FOREIGN PATENT DOCUMENTS

| JP | S57-96062 U | 6/1982 |
|---|---|---|
| JP | 2000-142475 A | 5/2000 |

(Continued)

OTHER PUBLICATIONS

Aug. 9, 2016 International Search Report issued in International Patent Application No. PCT/JP2016/068077.

*Primary Examiner* — Patrick Cicchino
(74) *Attorney, Agent, or Firm* — Oliff PLC (57) ABSTRACT

A brake pedal device includes a pedal bracket, an operation pedal, an intermediate lever, and a coupling link. The pedal bracket includes a first side plate member and a second side plate member secured to a dash panel and arranged at interval in a vehicle width direction, and is fastened and secured with respect to a vehicle body side bracket located on a vehicle rear side by a nut and a bolt at one location. The first side plate member and the second side plate member include a deformation allowing part and a deformation allowing part between a first support shaft located on a (Continued)

rearward side among the first support shaft and a second support shaft, and an attachment/securing part and an attachment/securing part.

8 Claims, 8 Drawing Sheets

(56) References Cited

U.S. PATENT DOCUMENTS

| | | | | |
|---|---|---|---|---|
| 6,808,040 | B2* | 10/2004 | Hayashihara | B60K 26/00 |
| | | | | 180/274 |
| 9,550,477 | B2 | 1/2017 | Kitaguchi | |
| 9,632,524 | B2* | 4/2017 | Kitaguchi | B60T 7/06 |
| 9,821,777 | B2* | 11/2017 | Uchida | G05G 1/30 |
| 2002/0189391 | A1* | 12/2002 | Matsumoto | B60R 21/09 |
| | | | | 74/512 |
| 2015/0329089 | A1 | 11/2015 | Kitaguchi | |

FOREIGN PATENT DOCUMENTS

| | | | | |
|---|---|---|---|---|
| JP | 2007-001372 | A | | 1/2007 |
| JP | 2010-111243 | A | | 5/2010 |
| JP | 2011-039583 | A | | 2/2011 |
| JP | 2012-128659 | A | | 7/2012 |
| JP | 2014-119927 | A | | 6/2014 |
| JP | 2014119927 | A | * | 6/2014 ............... G05G 1/32 |

* cited by examiner

VEHICLE OPERATION PEDAL DEVICE

CROSS-REFERENCE TO RELATED APPLICATION

This application is based upon and claims the benefit of priority of the prior Japanese Patent Application No. 2015-175330, filed on Sep. 7, 2015, the entire contents of which are incorporated herein by reference.

FIELD

The present disclosure relates to a vehicle operation pedal device secured to a dash panel and a vehicle body side member at two different locations.

BACKGROUND

A disclosure described in Japanese Laid-open Patent Publication No. 2007-001372, for example, is conventionally known as a vehicle operation pedal device. The vehicle brake pedal device described in Japanese Laid-open Patent Publication No. 2007-001372 is configured to include a pedal bracket arranged on a dash panel; a brake pedal that is pivotally arranged about a supporting shaft and that includes a depressing part used for a depressing operation toward a vehicle front side at a lower end; and a cam lever that is pivotally arranged about the supporting shaft and that is coupled to the brake pedal by way of a coupling link, the cam lever displacing a push rod projecting out from the dash panel toward the vehicle front side by being mechanically pivoted in an output direction in cooperation with the brake pedal.

Therefore, according to the vehicle brake pedal device described in Japanese Laid-open Patent Publication No. 2007-001372, when the depressing operation is performed on the brake pedal, an operating rod can pivot the cam lever in the output direction through the coupling link and push the push rod into a brake booster located on the vehicle front side, and thus can apply a braking force on the vehicle.

SUMMARY

According to an aspect of the embodiments, a vehicle operation pedal device includes: a pedal bracket secured to a dash panel on a vehicle front side; an operation pedal that is pivotally arranged by a first support shaft of the pedal bracket, and that includes a depressing part used for a depressing operation toward the vehicle front side; an intermediate lever that is pivotally supported around a second support shaft arranged parallel to the first support shaft with respect to the pedal bracket, and that displaces a predetermined output member toward the vehicle front side by pivoting in an output direction with the second support shaft as a center; and a coupling link that couples the operation pedal and the intermediate lever, and that pivots the intermediate lever in the output direction in cooperation with the depressing operation on the operation pedal; wherein the pedal bracket includes a pair of side plates secured to the dash panel and arranged at interval in a vehicle width direction, and is fastened and secured with respect to a vehicle body side member located on a vehicle rear side than the dash panel at one location; and the pair of side plates including a deformation allowing part that is a lower rigidity than other portions of the side plate, wherein the deformation allowing part is formed between an attachment/securing part where the pedal bracket is fastened and secured with respect to the vehicle body side member and the support shaft located on the vehicle rear side among the first support shaft and the second support shaft.

The object and advantages of the invention will be realized and attained by means of the elements and combinations particularly pointed out in the claims.

It is to be understood that both the forgoing general description and the following detailed description are exemplary and explanatory and are not restrictive of the invention.

DESCRIPTION OF EMBODIMENT

In the vehicle brake pedal device described in Japanese Laid-open Patent Publication No. 2007-001372, the pedal bracket is configured to include two side surface plates, where a vehicle front portion side of each side surface plate is secured to a dash panel lower serving as a vehicle body side member with a bolt and a nut. The pedal bracket is fastened and secured to a dash panel upper serving as a different vehicle body side member at one location using a bolt and a nut.

When securing the pedal bracket to two different vehicle body side members, as in the vehicle brake pedal device described in Japanese Laid-open Patent Publication No. 2007-001372, an attachment process of the pedal bracket is carried out over a plurality of processes including an attaching/securing task with respect to one vehicle body side member and an attaching/securing task with respect to the other vehicle body side member, and hence a shift may occur in a relative positional relationship of an attachment position of the pedal bracket with respect to one vehicle body side member and an attachment position of the pedal bracket with respect to the other vehicle body side member. In particular, when fastening and securing the pedal bracket to one vehicle body side member at one location, the side surface plates configuring the pedal bracket are sometimes displaced in a vehicle width direction accompanying a fastening task of the bolt, the nut, and the like, which becomes a factor for the shift in the relative positional relationship.

Furthermore, the one vehicle body side member and the other vehicle body side member may be formed with a fastening hole, and the like for fastening and securing the pedal bracket. In this case, the position of forming the fastening hole, and the like in each vehicle body side member may vary, and as a result, a shift may occur in the relative positional relationship of the attachment position of the pedal bracket with respect to one vehicle body side member and the attachment position of the pedal bracket with respect to the other vehicle body side member.

If a shift occurs in the relative positional relationship of the attachment position of the pedal bracket with respect to one vehicle body side member and the attachment position of the pedal bracket with respect to the other vehicle body side member, this may lead to deformation of the two side surface plates, and the like configuring the pedal bracket, and may cause failures in the operation of an operation pedal and an intermediate lever. For example, when a shift occurs in the vehicle width direction and a gap between the two side surface plates in the pedal bracket becomes narrow, a supporting shaft of the operation pedal and the intermediate lever may be adversely affected, and an operation failure pertaining to the pivoting operation of the operation pedal and the intermediate lever may occur. Furthermore, when a shift occurs in a front and rear direction of the vehicle, a positional precision related to the depressing part of the operation pedal may lower as an orientation of the pedal bracket and the operation pedal becomes different from an appropriate state.

The present disclosure relates to a vehicle operation pedal device secured to a dash panel and a vehicle body side member at two different locations, and provides the vehicle operation pedal device in which failures pertaining to an operation of an operation pedal can be suppressed even if a shift occurs in an attachment position with respect to the vehicle body side member, or the like.

A vehicle operation pedal device according to the present disclosure will be hereinafter described in detail with reference to the drawings for an embodiment applied on a brake pedal device 1 for a service brake.

(Schematic Configuration of Brake Pedal Device)

First, a schematic configuration of the brake pedal device 1 according to the present embodiment will be described in detail with reference to the drawings. In each figure below, each unit arranged on an inner side of a pedal bracket 5, and the like is indicated with a virtual line (broken line) to clearly illustrate a structure on the inner side.

The brake pedal device 1 according to the present embodiment is securely arranged with respect to a dash panel P that partitions an engine room and a vehicle compartment, and an instrument panel reinforcement I and a vehicle body side bracket 50 serving as vehicle body side members. The brake pedal device 1 includes the pedal bracket 5, an operation pedal 30, an intermediate lever 35, and a coupling link 40. The brake pedal device 1 displaces an operating rod R of a brake booster B toward a vehicle forward side when the operation pedal 30 is pivoted by a depressing operation of the operation pedal 30, thus generating a braking force with respect to a vehicle.

The brake booster B is securely arranged integrally on a vehicle front side (i.e., engine room side) of the dash panel P, and includes the operating rod R serving as an output member. When the operating rod R is displaced toward the vehicle front side, the brake booster B doubles the braking force transmitted through the operation pedal 30 and transmits the doubled braking force to the vehicle. The operating rod R is arranged to project out into the vehicle compartment on a vehicle rear side from the dash panel P, and is configured to be displaceable in a front and rear direction of the vehicle.

Figure 1:
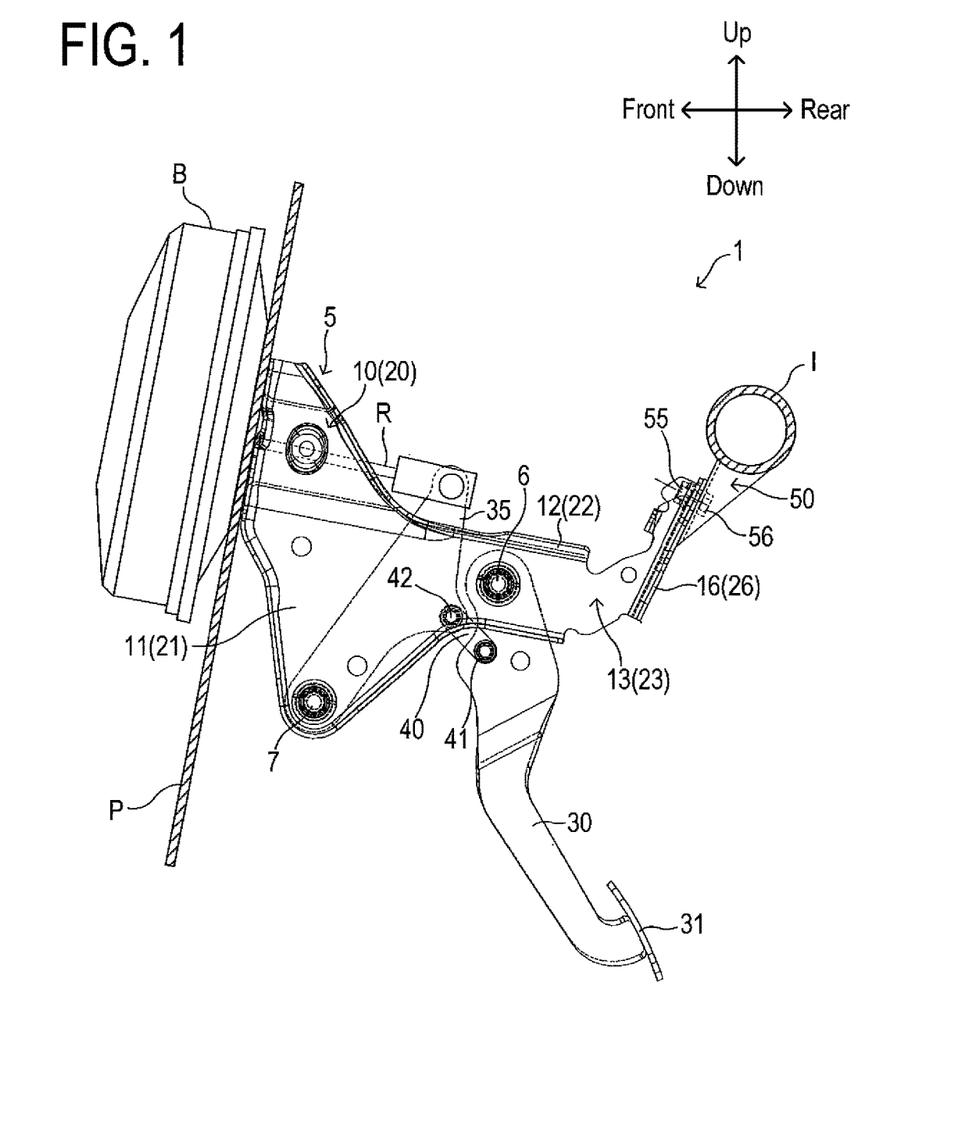
FIG. 1 is a side view illustrating a schematic configuration of a brake pedal device according to the present embodiment.

As illustrated in FIG. 1, the instrument panel reinforcement I is arranged on the vehicle rear side (driver's seat side) than the dash panel P, and configures one part of a vehicle body side member in the present disclosure. The instrument panel reinforcement I has a high rigidity, and generally, the possibility of being displaced toward the vehicle rear side and a deformation amount of when a large load is input from the vehicle forward side such as at the time of impact, and the like are smaller than the dash panel P.

The vehicle body side bracket 50 is securely arranged integrally with the instrument panel reinforcement I. The vehicle body side bracket 50 configures the vehicle body side member in the present disclosure along with the instrument panel reinforcement I. A rear side portion (attachment/securing part to be described later) of the pedal bracket 5 is fastened and secured to the vehicle body side bracket 50 at one location with a nut 55 and a bolt 56 (see FIG. 1).

The pedal bracket 5 is configured by a first side plate member 10 and a second side plate member 20 that are secured with respect to a vehicle compartment side of the dash panel P using a bolt, and the like and that face each other with a gap in a vehicle width direction. A specific configuration of the pedal bracket 5 will be described later.

A first support shaft 6 is arranged on a vehicle rearward side in the pedal bracket 5, and is extended substantially horizontally and substantially parallel with the vehicle width direction between the first side plate member 10 and the second side plate member 20 configuring the pedal bracket 5. A second support shaft 7 is located on the vehicle front side than the operation pedal 30, and is arranged to extend parallel to the first support shaft 6.

The operation pedal 30 has an upper part pivotally supported by the first support shaft 6, and includes a depressing part 31 at a lower end. Therefore, when the depressing operation is carried out using the depressing part 31, the operation pedal 30 is pivoted with the first support shaft 6 as a center, and the depressing part 31 is moved toward the vehicle front side.

The intermediate lever 35 has a lower end pivotally supported by the second support shaft 7, and is extended upward. The operating rod R is coupled to an upper end of the intermediate lever 35 by way of a clavis. Therefore, when the intermediate lever 35 is pivoted with the second support shaft 7 as the center, the operating rod R can be displaced in the front and rear direction of the vehicle. That is, according to the brake pedal device 1, the braking force can be generated through the brake booster B by displacing the operating rod R toward the vehicle front side with the intermediate lever 35.

The coupling link 40 couples an upper front side portion of the operation pedal 30 and a rear side portion of the intermediate lever 35, and is pivotally attached to the operation pedal 30 and the intermediate lever 35. One end side of the coupling link 40 is coupled to the upper front side portion of the operation pedal 30 by way of a connecting pin 41, and hence the coupling link 40 can be pivoted with respect to the operation pedal 30 with the connecting pin 41 as a center. The other end side of the coupling link 40 is coupled to the rear side portion of the intermediate lever 35 by way of a connecting pin 42, and hence the coupling link 40 can be pivoted with respect to the intermediate lever 35 with the connecting pin 42 as a center. Therefore, in the brake pedal device 1, the pivoting of the operation pedal 30 having the first support shaft 6 as a center can be transmitted to the intermediate lever 35 through the coupling link 40, so that the intermediate lever 35 can be pivoted with the second support shaft 7 as a center.

(Operation of Each Unit Involved in Depressing Operation of Operation Pedal)

Next, movement of each unit when the depressing operation of the operation pedal 30 is carried out in the brake pedal device 1 described above will be described.

When the depressing operation is carried out with respect to the operation pedal 30, the depressing part 31 is depressed toward the vehicle front side, and thus the operation pedal 30 is pivoted with the first support shaft 6 as the center. At this time, the upper part of the operation pedal 30 is pivoted toward a vehicle upward side with the first support shaft 6 as the center, and hence the pivoting of the operation pedal 30 is transmitted to the intermediate lever 35 through the coupling link 40.

As described above, since the coupling link 40 is coupled to the rear side portion of the intermediate lever 35 by way of the connecting pin 42, the intermediate lever 35 is pivoted with the second support shaft 7 as the center accompanying the pivoting of the operation pedal 30, and an upper part of the intermediate lever 35 can be moved toward the vehicle front side. Furthermore, since the operating rod R of the brake booster B is coupled to the upper part of the intermediate lever 35 by way of the clavis, the brake pedal device 1 can push the operating rod R in the output direction (vehicle front side) in cooperation with the depressing operation of the operation pedal 30, and can generate the braking force with respect to the vehicle.

(Specific Configuration of Pedal Bracket)

Next, a specific configuration of the pedal bracket 5 in the brake pedal device 1 according to the present embodiment will be described in detail with reference to the drawings. As described above, the pedal bracket 5 is configured by the first side plate member 10 and the second side plate member 20 that face each other with the gap in the vehicle width direction.

Figure 2:
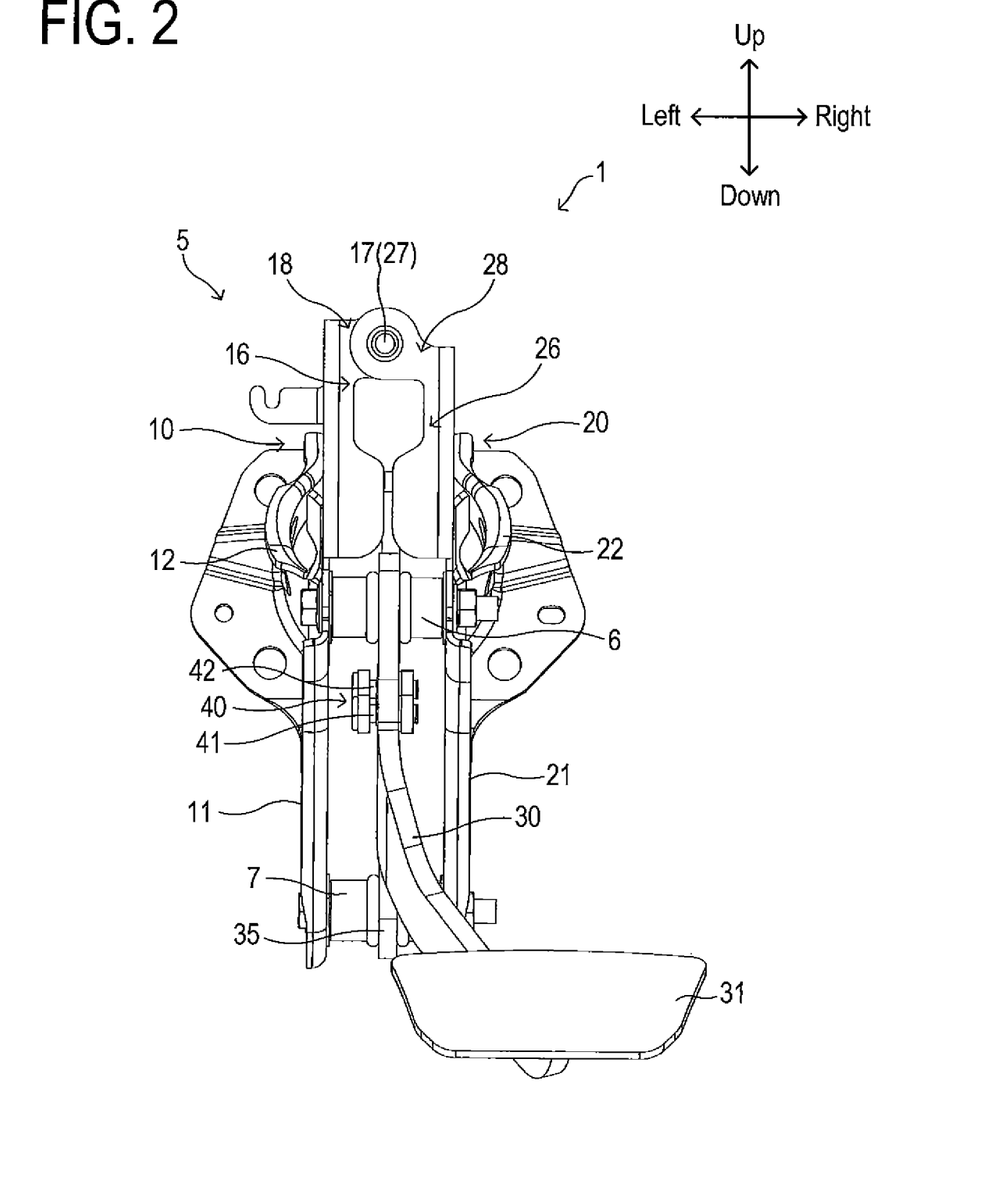
FIG. 2 is a rear view illustrating a schematic configuration of the brake pedal device according to the present embodiment.
Figure 3:
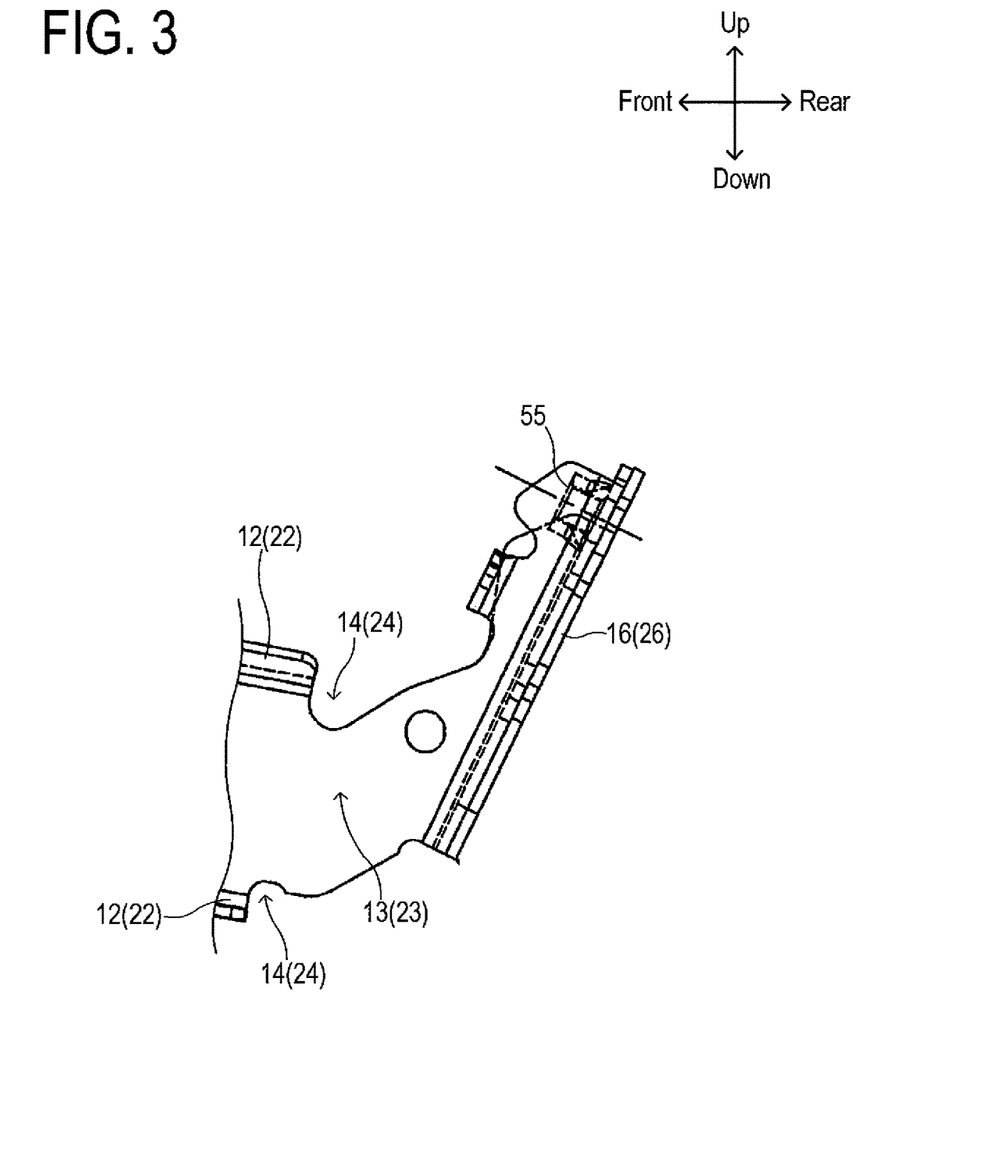
FIG. 3 is an enlarged side view illustrating a configuration of a deformation allowing part and an attachment/securing part.

As illustrated in FIGS. 1 to 3, the first side plate member 10 is a member made from a steel plate that configures a left side portion of the pedal bracket 5, and includes a side plate part 11, a flange part 12, a deformation allowing part 13, a cutout part 14, an attachment/securing part 16, a fastening hole 17, and a weak part 18. The second side plate member 20 is a member made from a steel plate that configures a right side portion of the pedal bracket 5, and includes a side plate part 21, a flange part 22, a deformation allowing part 23, a cutout part 24, an attachment/securing part 26, a fastening hole 27, and a weak part 28.

As illustrated in FIGS. 1 and 2, the first side plate member 10 and the second side plate member 20 are secured to the dash panel P on the vehicle front side at different positions by a bolt and a nut (not illustrated). The first side plate member 10 and the second side plate member 20 are jointly fastened and secured at one location by the nut 55 and the bolt 56 with respect to the vehicle body side bracket 50 located on the vehicle rear side (see FIGS. 1 to 4).

The first side plate member 10 and the second side plate member 20 thus have the same basic configuration, and hence the specific configuration of the first side plate member 10 will be described in detail in the following description, and the description on the second side plate member 20 will be omitted.

As illustrated in FIG. 1, the side plate part 11 of the first side plate member 10 configures a main part in the first side plate member 10 made from a steel plate. The side plate part 11 is a plate-like portion including a front side portion in the first side plate member 10, where one end of the first support shaft 6 and one end of the second support shaft 7 are arranged on the side plate part 11.

The flange part 12 is formed along an upper end edge and a lower end edge of the side plate part 11 configuring the a front side portion than the deformation allowing part 13 in the first side plate member 10, and is formed to project out toward an outer side direction (in this case, left side direction) of the pedal bracket 5 intersecting a plate surface of the side plate part 11 (see FIGS. 1 and 2). The flange part 12 functions as reinforcement with respect to the side plate part 11, which is the main part of the first side plate member 10, and enhances a rigidity (e.g., rigidity with respect to a deformation in an up and down direction and a left and right direction) of the side plate part 11.

In the second side plate member 20, the flange part 22 is formed to project out toward a right side direction with respect to the side plate part 21 of the second side plate member 20 along an upper end edge and a lower end edge of the side plate part 21.

The deformation allowing part 13 is formed so as to have a lower rigidity than the side plate part 11 on the rearward side with respect to the side plate part 11 of the first side plate member 10, and includes the cutout part 14 (see FIG. 3). As described above, the first support shaft 6 and the second support shaft 7 are arranged on the side plate part 11 portion, and thus the deformation allowing part 13 is located on the vehicle rearward side than the first support shaft 6 and the second support shaft 7. As will be described later, the deformation allowing part 13 is a portion that, when a width direction shift amount W and a front rear direction shift amount D are generated, absorbs the generated shift by being intensively deformed.

As illustrated in FIGS. 1 and 3, the deformation allowing part 13 is formed with a dimension in the up and down direction narrower than the side plate part 11 of the first side plate member 10. Thus, the deformation allowing part 13 is formed with the rigidity in the up and down direction lower than the side plate part 11. Furthermore, the deformation allowing part 13 does not include the flange part 12, as opposed to the side plate part 11, and is formed to a flat plate shape, and thus is formed with the rigidity in the up and down direction and the left and right direction lower than the side plate part 11.

As illustrated in FIG. 3, the cutout part 14 is formed by cutting out the upper side end edge and the lower side end edge of the deformation allowing part 13 on the vehicle forward side in the deformation allowing part 13 adjacent to the vehicle rearward side with respect to the flange part 12 in the side plate part 11 toward an inner side of the deformation allowing part 13 with respect to the up and down direction. A portion where the cutout part 14 is formed in the deformation allowing part 13 has the dimension in the up and down direction narrower than that of the other portions in the deformation allowing part 13. Therefore, the portion where the cutout part 14 is formed in the deformation allowing part 13 becomes a portion having the smallest rigidity. Furthermore, as a rear part of the side plate part 11 having the high rigidity and the cutout part 14 in the deformation allowing part 13 are adjacent and the difference in rigidity becomes the largest, a deformation of when a shift of the front rear direction shift amount D, and the like occurred can be concentrated at a periphery of the cutout part 14 in the deformation allowing part 13.

Figure 4:
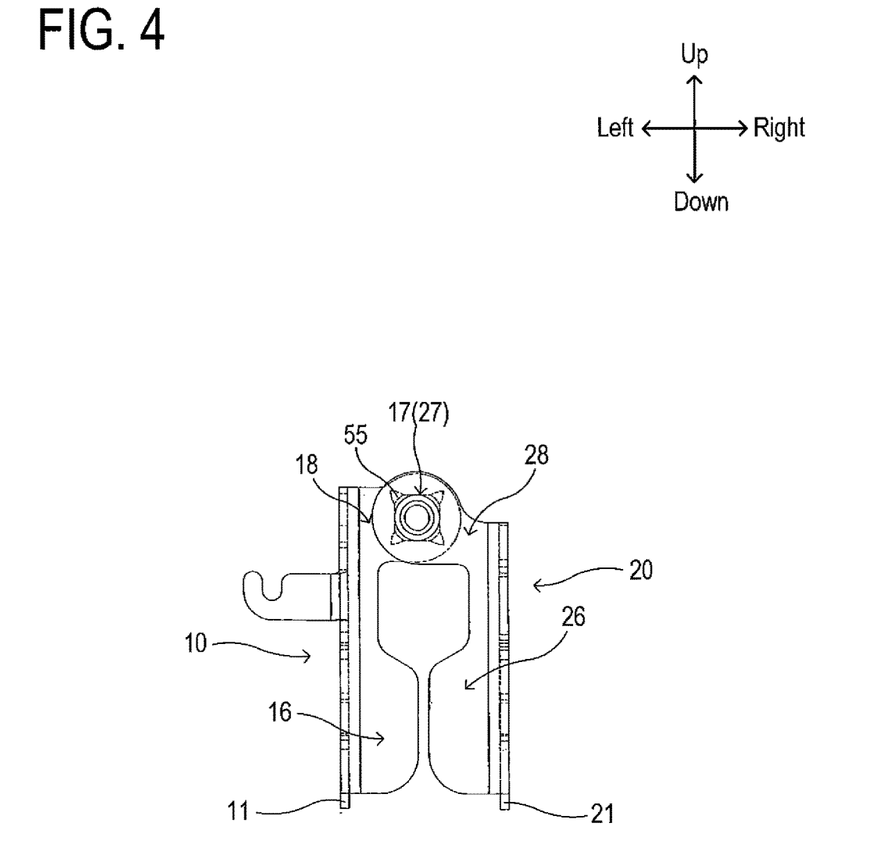
FIG. 4 is an enlarged rear view illustrating a configuration of the attachment/securing part.

As illustrated in FIGS. 2 and 4, the attachment/securing part 16 is formed by fold processing the vehicle rearward side (vehicle rearward side than the deformation allowing part 13) in the first side plate member 10 toward the inner side of the pedal bracket 5, and includes the fastening hole 17 and the weak part 18. The attachment/securing part 16 is formed by fold processing the vehicle rearward side in the first side plate member 10, and thus has a high rigidity than the deformation allowing part 13. The attachment/securing part 16 is jointly fastened with the attachment/securing part 26 of the second side plate member 20 with respect to the vehicle body side bracket 50, which is the vehicle body side member, and is used when fastening and securing the pedal bracket 5 at one location.

As illustrated in FIGS. 2 and 4, the fastening hole 17 is formed at an upper side portion in the attachment/securing part 16, and is located at a central portion in the vehicle width direction on a rear upper side of the pedal bracket 5. The bolt 56 for fastening and securing with respect to the vehicle body side bracket 50 on the vehicle rearward side is inserted into the fastening hole 17.

The weak part 18 is formed so as to have a lower rigidity than the other portions of the attachment/securing part 16 at a portion adjacent to the fastening hole 17. Specifically, the weak part 18 is formed so as to be constricted than the formed portion of the fastening hole 17 with respect to a dimension in the up and down direction of the attachment/securing part 16. Therefore, the weak part 18 becomes a portion having the smallest rigidity in the attachment/securing part 16, and when a shift of the front rear direction shift amount D, and the like occurs, the shift can be absorbed by concentrating a deformation at the weak part 18.

(Attachment Process of Pedal Bracket to Dash Panel and Vehicle Body Side Bracket)

An attachment process of securing the pedal bracket 5 to the dash panel P and the vehicle body side bracket 50 when arranging the brake pedal device 1 configured as above in the vehicle will now be described with reference to the drawings.

Figure 5A:
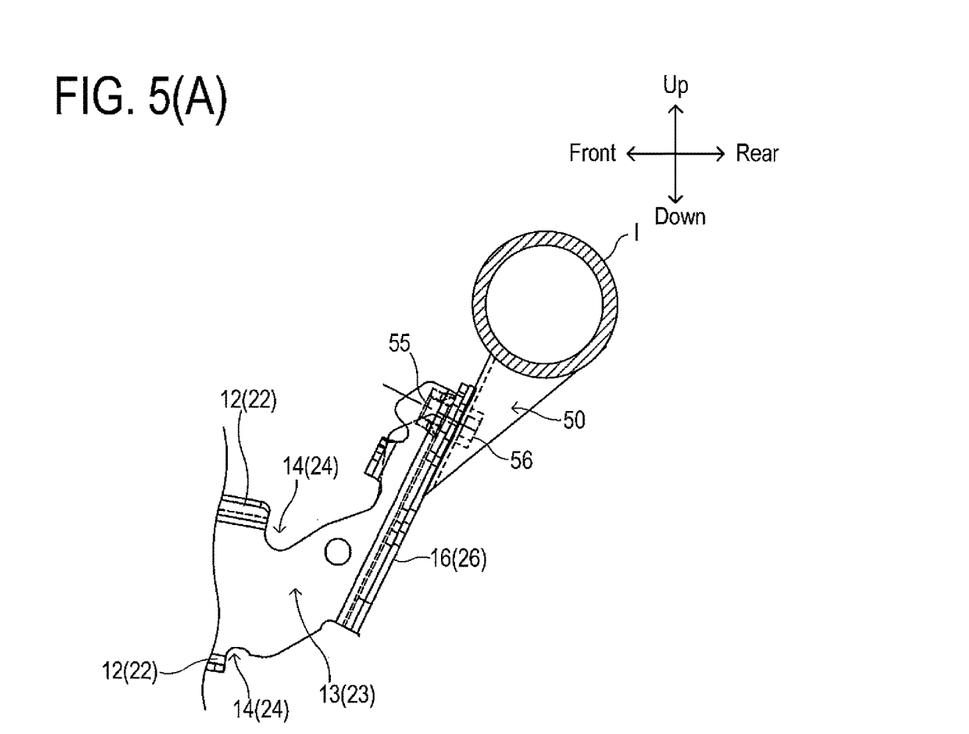
FIG. 5A, 5B are explanatory views related to securing a pedal bracket with respect to a vehicle body side bracket.
Figure 5B:
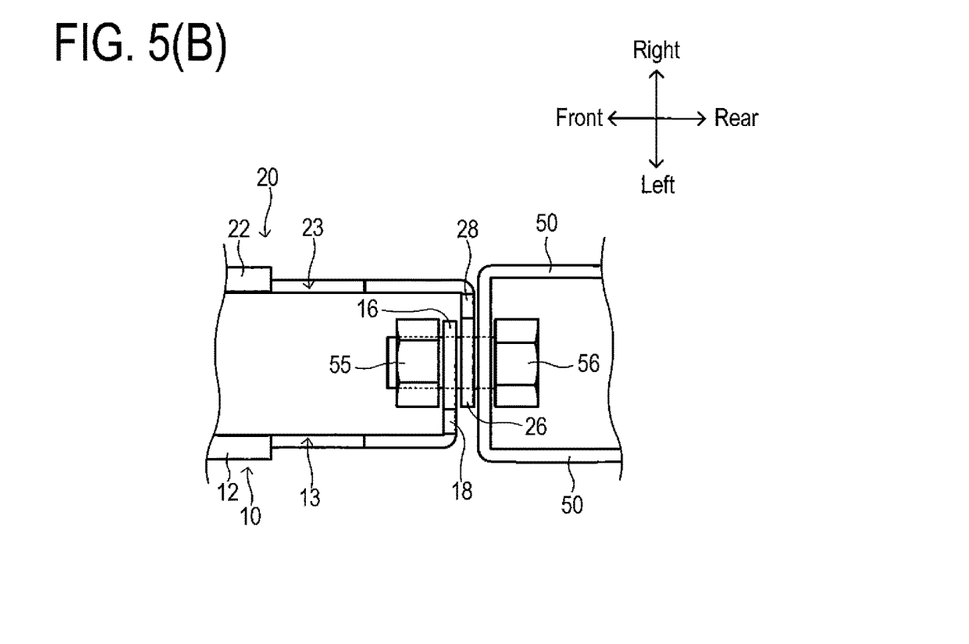

FIG. 5 is an explanatory view illustrating a state in which the attachment/securing part 16 and the attachment/securing part 26 are fastened and secured to the vehicle body side bracket 50, where FIG. 5A is a side view of a periphery of the attachment/securing part 16 and the attachment/securing part 26, and FIG. 5B is a top view of the periphery of the attachment/securing part 16 and the attachment/securing part 26.

First, the first side plate member 10 and the second side plate member 20 are secured with respect to the dash panel P. As illustrated in FIGS. 1 and 2, the first side plate member 10 is secured with respect to a predetermined position on a left side of the operating rod R projecting out from the dash panel P by fastening a front side end edge of the first side plate member 10 at a plurality of locations with a bolt, and the like. The second side plate member 20 is secured with respect to a predetermined position on a right side of the operating rod R by fastening a front side end edge of the second side plate member 20 at a plurality of locations with a bolt, and the like.

Thereafter, the first side plate member 10 and the second side plate member 20 secured to the dash panel P are fastened and secured with respect to the vehicle body side bracket 50, which is the vehicle body side member, at one location using the nut 55 and the bolt 56. Specifically, the fastening hole 17 of the attachment/securing part 16 and the fastening hole 27 of the attachment/securing part 26 are overlapped so that the attachment/securing part 26 of the second side plate member 20 is located on a rear side of the attachment/securing part 16 of the first side plate member 10. The bolt 56 is then inserted into the fastening hole 17 and the fastening hole 27, and the vehicle body side bracket 50, and a rear part of the pedal bracket 5 is fastened and secured with respect to the vehicle body side bracket 50 at one location with the bolt 56 and the nut 55.

When securing the first side plate member 10 and the second side plate member 20 configuring the pedal bracket 5 to the dash panel P and the vehicle body side bracket 50, the first side plate member 10 and the second side plate member 20 are not limited to always being fastened and secured with respect to the vehicle body side bracket 50 at one location without deforming the first side plate member 10 and the second side plate member 20.

For example, in carrying out the attachment process described above, the positions of the instrument panel reinforcement I and the vehicle body side bracket 50 may shift in the front and rear direction, the left and right direction, and the up and down direction of the vehicle from a predetermined design position. In this case, the first side plate member 10 and the second side plate member 20 sometimes need to be deformed to appropriately secure the pedal bracket 5 to the dash panel P and the vehicle body side bracket 50.

The attaching task of the first side plate member 10 and the second side plate member 20 with respect to the dash panel P is also not limited to always being carried out with high precision and the side plate members are sometimes attached shifted from the predetermined positions. In this case as well, the first side plate member Id and the second side plate member 20 sometimes may need to be deformed to appropriately secure the pedal bracket 5 to the vehicle body side bracket 50.

As the first support shaft 6 and the second support shaft 7 are affected depending on deformations of the first side plate member 10 and the second side plate member 20, failures such as the pivoting operation of the operation pedal 30 and the intermediate lever 35 is inhibited, or the position of the depressing part 31 of the operation pedal 30 is shifted from the desired design position may arise.

Furthermore, in the fastening and securing of the nut 55 and the bolt 56 with respect to the vehicle body side bracket 50, the positions of the first side plate member 10 and the second side plate member 20 may be displaced as a fastening load of the nut 55 and the bolt 56 acts on the first side plate member 10 and the second side plate member 20. For example, if the gap between the first side plate member 10 and the second side plate member 20 is narrowed by the action of the fastening load of the bolt 56, and the like, the first support shaft 6 and the second support shaft 7 may be affected, and the pivoting operation of the operation pedal 30 and the intermediate lever 35 may be inhibited.

(Action of when Shift Occurred in Attachment Position)

The brake pedal device 1 according to the present embodiment maintains a smooth pivoting operation of the operation pedal 30 and the intermediate lever 35 and can suppress the lowering of positional precision in the depressing part 31 of the operation pedal 30 even if a shift occurred when securing the first side plate member 10 and the second side plate member 20 configuring the pedal bracket 5 to the dash panel P and the vehicle body side bracket 50. A case in which the shift in the vehicle width direction (width direction shift amount W) occurred and a case in which the shift in the front and rear direction (front-rear direction shift amount D) occurred between the attachment position with respect to the dash panel P and the attachment position with respect to the vehicle body side bracket 50 will be hereinafter described with reference to the drawings.

(Action of when Width Direction Shift Amount Occurred)

Figure 6A:
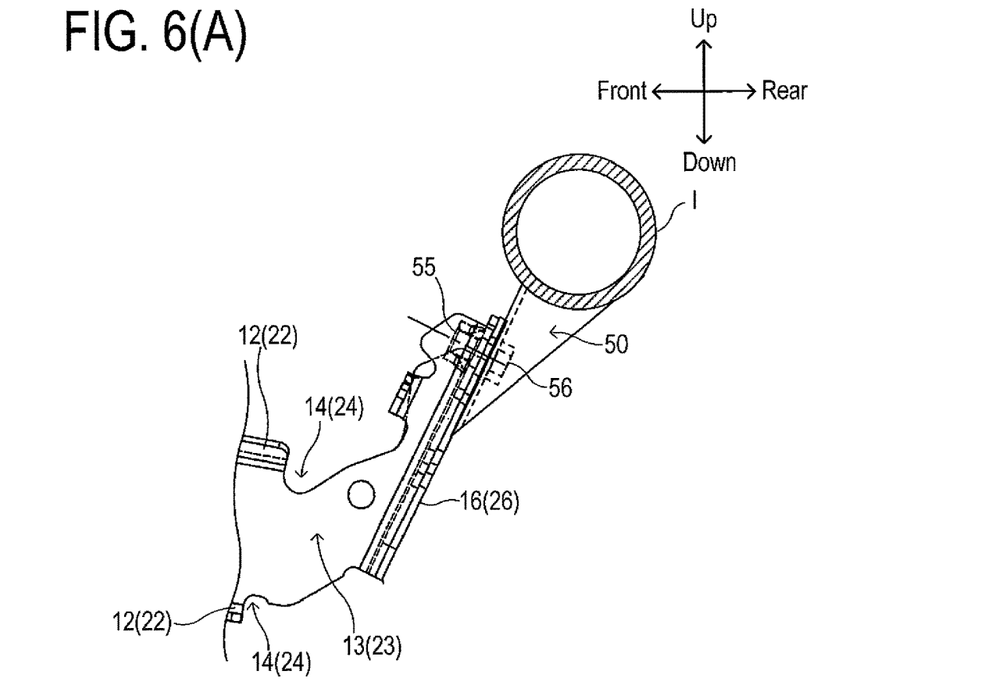
FIG. 6A, 6B are explanatory views related to securing the pedal bracket when a positional shift in a vehicle width direction occurred.

First, the action for the case in which the shift in the vehicle width direction (width direction shift amount W) occurred between the attachment position with respect to the dash panel P and the attachment position with respect to the vehicle body side bracket 50 will be described with reference to FIG. 6. In the case illustrated in FIG. 6, the shift of the width direction shift amount W is assumed to have occurred toward the left side in the vehicle width direction with respect to the attachment position to the dash panel P due to factors such as attachment position of the vehicle body side bracket 50 with respect to the instrument panel reinforcement I, attachment position of the first side plate member 10 and the second side plate member 20 with respect to the dash panel P, and the like.

Front end edges of the first side plate member 10 and the second side plate member 20 are secured to the dash panel P using the bolt, and the like, where the attachment/securing part 16 of the first side plate member 10 needs to be deformed to be located on the left side in the vehicle width direction with respect to the side plate part 11 and the attachment/securing part 26 of the second side plate member 20 needs to be deformed to be located on the left side in the vehicle width direction with respect to the side plate part 21 to fasten and secure the pedal bracket 5 with respect to the vehicle body side bracket 50 shifted toward the left side in the vehicle width direction by the width direction shift amount W with the nut 55 and the bolt 56.

Figure 6B:
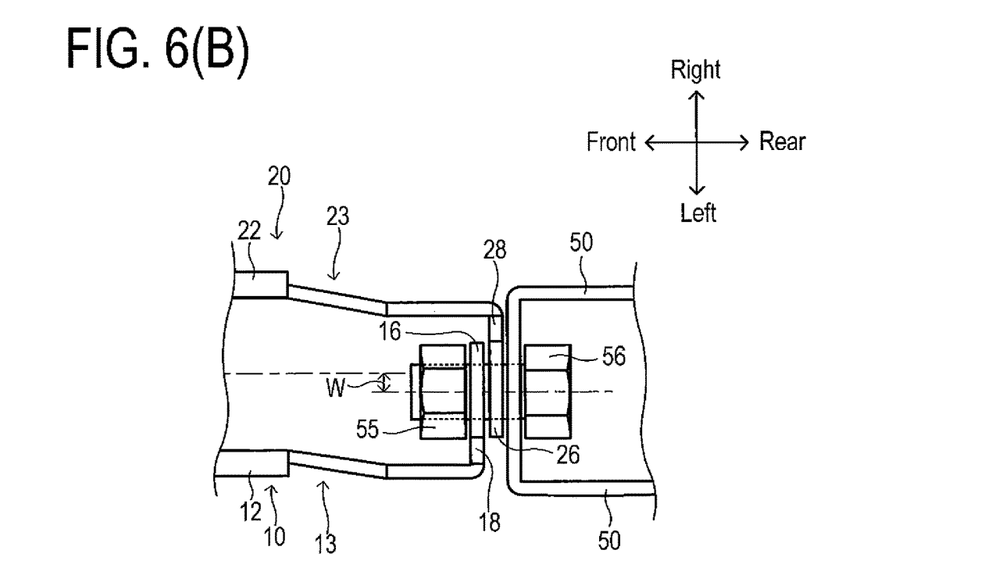

When deforming the attachment/securing part 16 of the first side plate member 10 so as to be located on the left side in the vehicle width direction with respect to the side plate part 11, the deformation of the first side plate member 10 intensively occurs at the deformation allowing part 13 having the lowest rigidity (see FIG. 6B). Thus, the width direction shift amount W can be absorbed by a deformation in the deformation allowing part 13, whereby an influence on the side plate part 11 located on the vehicle forward side than the deformation allowing part 13 can be suppressed.

Similarly, when deforming the attachment/securing part 26 of the second side plate member 20 so as to be located on the left side in the vehicle width direction with respect to the side plate part 21, the deformation of the second side plate member 20 intensively occurs at the deformation allowing part 23 having the lowest rigidity (see FIG. 6B). Thus, the width direction shift amount W can be absorbed by a deformation in the deformation allowing part 23, whereby an influence on the side plate part 21 located on the vehicle forward side than the deformation allowing part 23 can be suppressed.

In other words, according to the brake pedal device 1, a shift of the width direction shift amount W can be absorbed by the deformation of the deformation allowing part 13 and the deformation allowing part 23, and hence a gap between the side plate part 11 and the side plate part 21 can be maintained to a desired gap. Thus, even if the shift of the width direction shift amount W occurs, the brake pedal device 1 can reduce an influence on the first support shaft 6 and the second support shaft 7 and hence can maintain the smooth pivoting operation of the operation pedal 30 and the intermediate lever 35.

(Action of when Front-Rear Direction Shift Amount Occurred)

Now, the action for the case in which the shift in the front and rear direction of the vehicle (front-rear direction shift amount D) occurred between the attachment position with respect to the dash panel P and the attachment position with respect to the vehicle body side bracket 50 will be described with reference to FIG. 7. In the case illustrated in FIG. 7 as well, the shift of the front-rear direction shift amount D is assumed to have occurred toward the rear direction of the vehicle with respect to the attachment position to the dash panel P due to factors such as attachment position of the vehicle body side bracket 50 with respect to the instrument panel reinforcement I, attachment position of the first side plate member 10 and the second side plate member 20 with respect to the dash panel P, and the like.

Front end edges of the first side plate member 10 and the second side plate member 20 are secured to the dash panel P using the bolt, and the like, where the attachment/securing part 16 of the first side plate member 10 needs to be deformed by the front-rear direction shift amount D toward the vehicle rearward side and the attachment/securing part 26 of the second side plate member 20 needs to be deformed by the front-rear direction shift amount D toward the vehicle rearward side to fasten and secure the pedal bracket 5 with respect to the vehicle body side bracket 50 shifted toward the vehicle rearward side by the front-rear direction shift amount D with the nut 55 and the bolt 56.

Figure 7A:
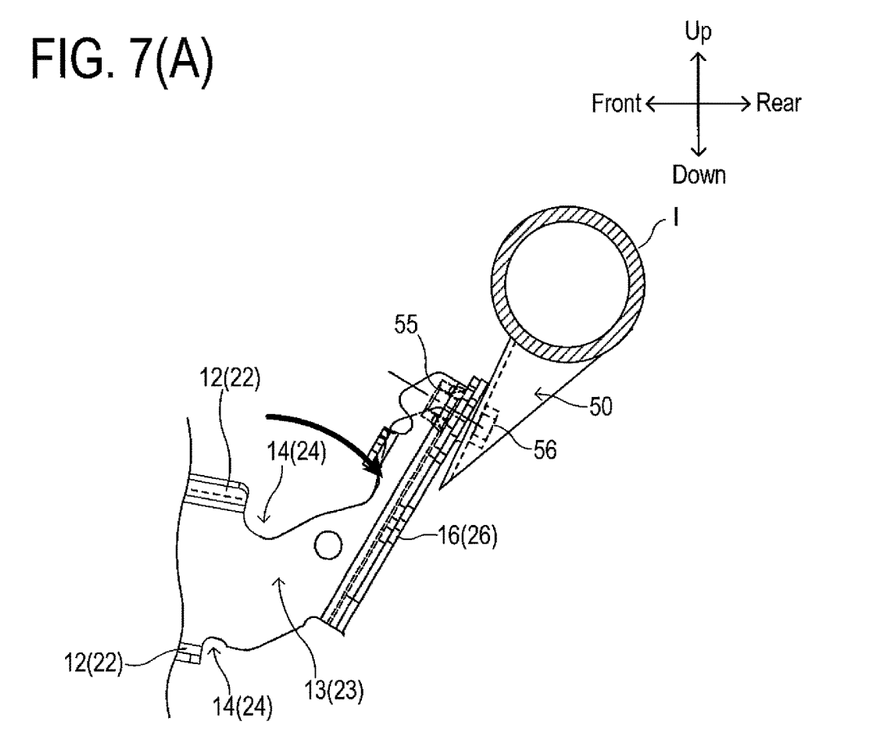
FIG. 7A, 7B are explanatory views related to securing the pedal bracket when a positional shift in a front and rear direction of the vehicle occurred.

When deforming the attachment/securing part 16 of the first side plate member 10 by the front-rear direction shift amount D toward the vehicle rearward side, the deformation of the first side plate member 10 is concentrated at the deformation allowing part 13 having the lowest rigidity, and in particular, occurs so as to pivot the attachment/securing part 16 toward the rear lower side with the cutout part 14 as a center (see FIG. 7A). The front-rear direction shift amount D thus can be absorbed to a certain extent by a bending deformation that occurred in the deformation allowing part 13, and the influence on the side plate part 11 located on the vehicle forward side than the defamation allowing part 13 can be suppressed.

Similarly, when deforming the attachment/securing part 26 of the second side plate member 20 by the front-rear direction shift amount D toward the vehicle rearward side, the deformation of the second side plate member 20 is concentrated at the deformation allowing part 23 having the lowest rigidity, and in particular, occurs so as to pivot the attachment/securing part 26 toward the rear lower side with the cutout part 24 as a center (see FIG. 7A). The front-rear direction shift amount D thus can be absorbed to a certain extent by a bending deformation that occurred in the deformation allowing part 23, and the influence on the side plate part 21 located on the vehicle forward side than the deformation allowing part 23 can be suppressed.

When the attachment/securing part 16 and the attachment/securing part 26 are displaced so as to pivot toward the rear lower side with the cutout part 14, cutout part 24 as the center by the deformation of the deformation allowing part 13 and the deformation allowing part 23, a gap forms between the attachment/securing part 16 and the attachment/securing part 26, and the vehicle body side bracket 50.

Figure 7B:
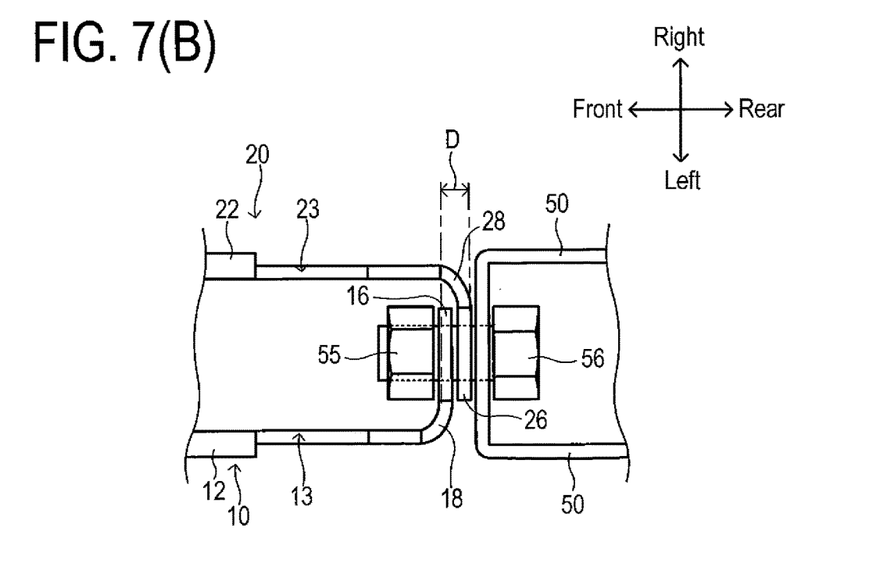

In this case, when fastening and securing the attachment/securing part 16 and the attachment/securing part 26 to the vehicle body side bracket 50 with the nut 55 and the bolt 56, the weak part 18 and the weak part 28 are deformed toward the vehicle rearward side by the fastening load of the nut 55 and the bolt 56, and closely attached to a front surface side of the vehicle body side bracket 50 (see FIG. 7B). In other words, the gap (i.e., microscopic shift) formed between the attachment/securing part 16 and the attachment/securing part 26, and the vehicle body side bracket 50 can be absorbed by the deformation of the weak part 18 and the weak part 28, whereby the rear part of the pedal bracket 5 (attachment/securing part 16 and attachment/securing part 26) can be more reliably fastened and secured to the vehicle body side bracket 50 with the nut 55 and the bolt 56.

In other words, according to the brake pedal device 1, the shift of the front-rear direction shift amount D can be absorbed by the deformation of the deformation allowing part 13 and the deformation allowing part 23, and the deformation of the weak part 18 and the weak part 28, and hence the gap of the side plate part 11 and the side plate part 21 can be maintained at the desired gap. Thus, even if the shift of the front-rear direction shift amount D occurs, the brake pedal device 1 can reduce the influence on the first support shaft 6 and the second support shaft 7, and can maintain the smooth pivoting operation of the operation pedal 30 and the intermediate lever 35. In such a case, the influence on the position of the first support shaft 6 in the pedal bracket 5 can be reduced, whereby the position of the depressing part 31 of the operation pedal 30 can be arranged at the desired design position, and a positional precision of the depressing part 31 can be maintained.

As described above, according to the brake pedal device 1 of the present embodiment, when the width direction shift amount W or the front-rear direction shift amount D occurs, the shift can be absorbed by the deformation of the deformation allowing part 13 and the deformation allowing part 23. In regards to this, according to the brake pedal device 1, even if a shift in the up and down direction of the vehicle occurs between the attachment position to the dash panel P and the attachment position to the vehicle body side bracket 50, the positions of the fastening hole 17 and the fastening hole 27 can be adjusted in the up and down direction by deforming the attachment/securing part 16, the attachment/securing part 26 so as to pivot with the cutout part 14, the cutout part 24 as the center. In other words, according to the brake pedal device 1, even if the shift in the up and down direction occurs, the shift in the up and down direction can be absorbed by the deformation of the deformation allowing part 13 and the deformation allowing part 23.

In the description described above, the case in which the shift of the width direction shift amount W occurs (see FIG. 6), the case in which the shift of the front-rear direction shift amount D occurs (see FIG. 7), and the case in which the shift in the up and down direction occurs have been described, each being described as an individual event, but this mode is not the sole case. In other words, even if a plurality of shifts among the above occur in compound, the brake pedal device 1 can concentrate the deformation at the deformation allowing part 13 and the deformation allowing part 23 to absorb the shift. For example, when shift of a compound of the width direction shift amount W and the front-rear direction shift amount D occurs, the brake pedal device 1 can deform the deformation allowing part 13 and the deformation allowing part 23 as illustrated in FIGS. 6 and 7 to absorb the shift.

As described above, the brake pedal device 1 according to the present embodiment includes the pedal bracket 5, the operation pedal 30, the intermediate lever 35, and the coupling link 40, and can pivot the intermediate lever 35 through the coupling link 40 in cooperation with the pivoting of the operation pedal 30 involved in the depressing operation, and hence can displace the operating rod R of the brake booster B toward the vehicle front side.

Here, in the brake pedal device 1, the pedal bracket 5 includes the first side plate member 10 and the second side plate member 20 that are secured with respect to the dash panel P and arranged with the gap in the vehicle width direction, and is fastened and secured with respect to the vehicle body side bracket 50 and the instrument panel reinforcement I serving as the vehicle body side member located on the vehicle rear side at one location by the nut 55 and the bolt 56.

The first side plate member 10 and the second side plate member 20 include the deformation allowing part 13 and the deformation allowing part 23 (see FIG. 1) between the support shaft (i.e., first support shaft 6) located on the vehicle rear side among the first support shaft 6 and the second support shaft 7, and the attachment/securing part 16 and the attachment/securing part 26. The deformation allowing part 13 and the deformation allowing part 23 are formed to have a lower rigidity than other portions (e.g., side plate part 11) in the first side plate member 10 and other portions (e.g., side plate part 21) in the second side plate member 20, respectively. Therefore, according to the brake pedal device 1, even if the positional relationship of the attachment position of the pedal bracket 5 with respect to the dash panel P and the attachment position of the pedal bracket 5 with respect to the vehicle body side bracket 50 is shifted from an appropriate position, the shift can be absorbed by the deformation in the deformation allowing part 13 of the first side plate member 10 and the deformation allowing part 23 of the second side plate member 20.

Furthermore, since the deformation allowing part 13 and the deformation allowing part 23 are formed between the first support shaft 6 located on the vehicle rear side among the first support shaft 6 and the second support shaft 7, and the attachment/securing part 16 and the attachment/securing part 26, the portion on the vehicle front side (i.e., side plate part 11 and side plate part 21) than the deformation allowing part 13 and the deformation allowing part 23 can maintain an appropriate state by absorbing the shift by the deformation of the deformation allowing part 13 and the deformation allowing part 23. Thus, a periphery of the first support shaft 6 and the second support shaft 7 becomes an appropriate state, whereby the brake pedal device 1 can realize a normal operation of the operation pedal 30 and the intermediate lever 35 even if the positional relationship of the attachment position of the pedal bracket 5 with respect to the dash panel P and the attachment position of the pedal bracket 5 with respect to the vehicle body side bracket 50 is shifted from the appropriate position.

Furthermore, in the first side plate member 10 and the second side plate member 20, the flange part 12 and the flange part 22 are projected out in the outer side direction of the pedal bracket 5 intersecting the side plate part 11 and the side plate part 21 along the upper end edge and the lower end edge extending in the front and rear direction of the vehicle in the side plate part 11 and the side plate part 21, and thus the rigidity of the side plate part 11 and the side plate part 21 can be enhanced.

The deformation allowing part 13 and the deformation allowing part 23 are formed to have a lower rigidity than the side plate part 11 and the side plate part 21 on the rearward side with respect to the side plate part 11 of the first side plate member 10 and the side plate part 21 of the second side plate member 20, and include the cutout part 14 and the cutout part 24 (see FIGS. 1 and 3). The deformation allowing part 13 and the deformation allowing part 23 are formed with the dimension in the up and down direction narrower than the side plate part 11 of the first side plate member 10 and the side plate part 21 of the second side plate member 20, and are formed to a flat plate shape without the flange part 12 and the flange part 22, and thus have the rigidity in the up and down direction and the left and right direction made lower than the side plate part 11 and the side plate part 21.

As illustrated in FIG. 3, the cutout part 14 and the cutout part 24 are formed at a portion on the vehicle forward side than the deformation allowing part 13 and the deformation allowing part 23 adjacent on the vehicle rearward side with respect to the flange part 12 in the side plate part 11 and the flange part 22 in the side plate part 21. On the upper edge side of the deformation allowing part 13 and the deformation allowing part 23, the cutout part 14 and the cutout part 24 are formed by cutting out the steel plate configuring the deformation allowing part 13 and the deformation allowing part 23 toward the lower side from the upper side end edge. Similarly, on the lower edge side of the deformation allowing part 13 and the deformation allowing part 23, the cutout part 14 and the cutout part 24 are for rued by cutting out the steel plate configuring the deformation allowing part 13 and the deformation allowing part 23 toward the upper side from the lower side end edge. Therefore, in the deformation allowing part 13 and the deformation allowing part 23, portions where the cutout part 14 and the cutout part 24 are formed become portions of smallest rigidity. Furthermore, since the rear part of the side plate part 11 and the side plate part 21 having the high rigidity and the cutout part 14 in the deformation allowing part 13 and the cutout part 24 in the deformation allowing part 23 are adjacent, and the difference in rigidity becomes the largest, the deformation of when the shift of the front-rear direction shift amount D occurred can be concentrated at the periphery of the cutout part 14 in the deformation allowing part 13 and the cutout part 24 in the deformation allowing part 23. Therefore, according to the brake pedal device 1, the shift can be reliably absorbed by the deformation allowing part 13 and the deformation allowing part 23.

As illustrated in FIGS. 2 and 4, the attachment/securing part 16 is configured to include the fastening hole 17 and the weak part 18, and the attachment/securing part 26 is configured to include the fastening hole 27 and the weak part 28. The weak part 18 and the weak part 28 are formed to be constricted than the formed portion of the fastening hole 17 and the fastening hole 27 with respect to the dimension in the up and down direction of the attachment/securing part 16 and the attachment/securing part 26 at both sides in the vehicle width direction with respect to the fastening hole 17 and the fastening hole 27 used for fastening and securing by the nut 55 and the bolt 56, and have a lower rigidity than the other portions of the attachment/securing part 16 and the attachment/securing part 26.

Therefore, according to the brake pedal device 1, the position of the fastening part by the nut 55 and the bolt 56 can be changed with respect to the attachment/securing part 16 and the attachment/securing part 26 in the front and rear direction of the vehicle by deforming the weak part 18 and the weak part 28. Thus, even if the shift of the front-rear direction shift amount D occurs, the brake pedal device 1 can absorb the shift of the front-rear direction shift amount D by deforming the weak part 18 and the weak part 28, and attach and secure the pedal bracket 5 to the appropriate position in the dash panel P and the vehicle body side bracket 50, and suppress the lowering in the positional precision related to the depressing part 31 of the operation pedal 30.

According to the brake pedal device 1, even if the first side plate member 10 and the second side plate member 20 configuring the pedal bracket 5 are jointly fastened, and fastened and secured to the vehicle body side bracket 50 by the nut 55 and the bolt 56 through the fastening hole 17 of the attachment/securing part 16 and the fastening hole 27 of the attachment/securing part 26, the shift between the attachment position of the pedal bracket 5 with respect to the dash panel P and the attachment position of the pedal bracket 5 with respect to the vehicle body side bracket 50 can be absorbed by the deformation of the deformation allowing part 13 and the deformation allowing part 23, and the normal operation of the operation pedal 30 and the intermediate lever 35 can be realized.

The present disclosure has been described above based on the embodiment, but the present disclosure is not, in any sense, limited to such embodiment, and various modifications can be made within a scope not departing from the gist of the present disclosure. For example, in the embodiment described above, a rear part of the first side plate member 10 is fold processed to obtain the attachment/securing part 16, a rear part of the second side plate member 20 is fold processed to obtain the attachment/securing part 26, and the attachment/securing part 16 and the attachment/securing part 26 are fastened and secured to the vehicle body side bracket 50 by the nut 55 and the bolt 56, but this mode is not the sole case. Various modes can be adopted as long as the rear part of the pedal bracket 5 can be fastened and secured with respect to the vehicle body side member at one location.

Figure 8A:
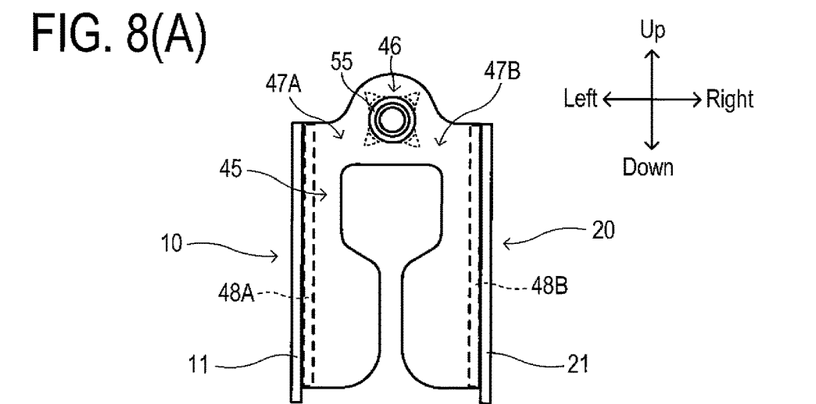
FIG. 8A, 8B, 8C are explanatory views illustrating a variant of securing the pedal bracket with respect to the vehicle body side bracket.
Figure 8B:
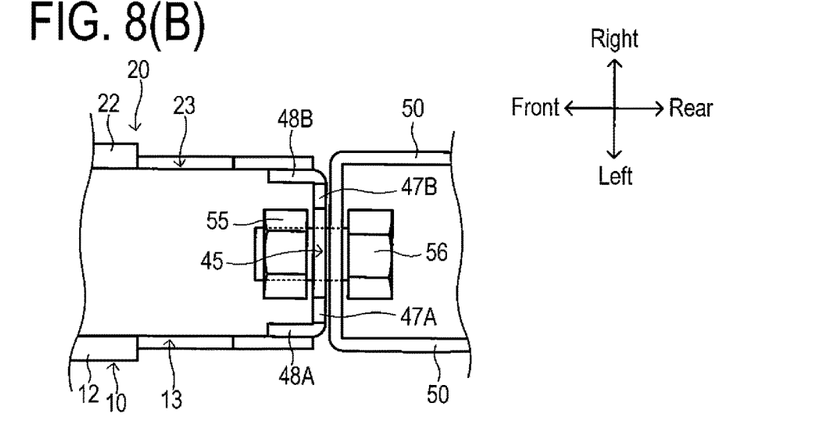
Figure 8C:
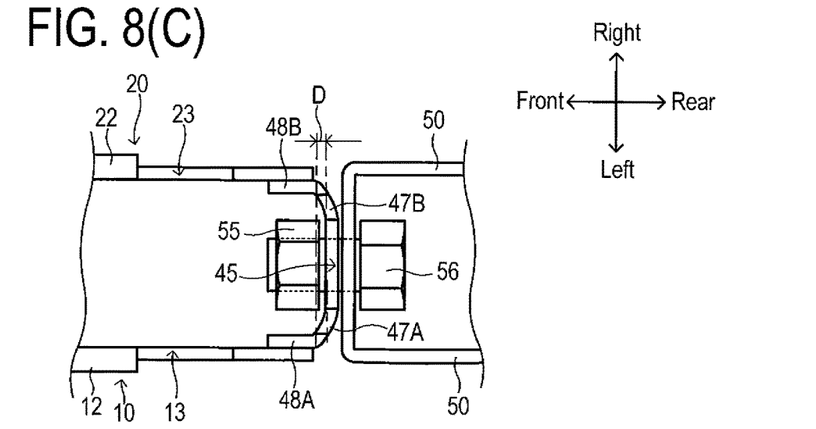

For example, as illustrated in FIG. 8, the pedal bracket 5 may be configured by the first side plate member 10 without the attachment/securing part 16, the second side plate member 20 without the attachment/securing part 26, and an attaching/securing member 45 formed to have a horseshoe cross-sectional shape. In this case, the attaching/securing member 45 is configured to include a fastening hole 46, a weak part 47A, a weak part 47B, a first side plate fixing part 48A, and a second side plate fixing part 48B, and is strongly secured with respect to the rear end part of the first side plate member 10 and the second side plate member 20 by welding, and the like. The fastening hole 46 is formed at an upper side portion in the attaching/securing member 45, and is located at a central portion in the vehicle width direction on the rear upper side of the pedal bracket 5. The bolt 56 is inserted into the fastening hole 46, and fastened and secured with respect to the vehicle body side bracket 50 in cooperation with the nut 55.

The weak part 47A and the weak part 47B are formed so as to be constricted than the formed portion of the fastening hole 46 at both side portions in the vehicle width direction of the fastening hole 46, and are formed to have a lower rigidity than other portions in the attaching/securing member 45. Similar to the weak part 18 and the weak part 28 of the embodiment described above, when a shift of the front-rear direction shift amount D, and the like occurs, the weak part 47A and the weak part 47B absorb the shift by concentrating a deformation at the weak part 47A and the weak part 47B.

The first side plate fixing part 48A is a portion that has a flat plate shape extending in the front and rear direction of the vehicle and that is secured to the rear end part of the first side plate member 10 by welding, and the like at a left side portion of the attaching/securing member 45. The second side plate fixing part 48B is a portion that has a flat plate shape extending in the front and rear direction of the vehicle and that is secured to the rear end part of the second side plate member 20 by welding, and the like at a right side portion of the attaching/securing member 45.

As illustrated in FIGS. 8B and 8C, even if the pedal bracket 5 including the attaching/securing member 45 is adopted, when fastening and securing the pedal bracket 5 with respect to the vehicle body side bracket 50 by the nut 55 and the bolt 56, the weak part 47A and the weak part 47B are deformed toward the vehicle rearward side by the fastening load of the nut 55 and the bolt 56, and are closely attached to the front surface side of the vehicle body side bracket 50. In other words, since the front-rear direction shift amount D that occurred between the attaching/securing member 45 and the vehicle body side bracket 50 can be absorbed by the deformation of the weak part 47A and the weak part 47B, the attaching/securing member 45, which is the rear part of the pedal bracket 5 can be more reliably fastened and secured with respect to the vehicle body side bracket 50 by the nut 55 and the bolt 56.

In the embodiment described above, the intermediate lever 35 and the second support shaft 7 are located on the vehicle forward side in the brake pedal device 1, and the operation pedal 30 and the first support shaft 6 are located on the rearward side, but this mode is not the sole case. In other words, the present disclosure can also be applied to a configuration in which the operation pedal 30 and the first support shaft 6 are located on the vehicle forward side in the brake pedal device 1, and the intermediate lever 35 and the second support shaft 7 are located on the rearward side.

Furthermore, the configuration of the deformation allowing part 13 and the deformation allowing part 23 in the embodiment described above is an example, and various modes can be adopted as long as such parts have a lower rigidity than the other portions in the first side plate member 10 and the second side plate member 20. For example, a plate thickness of portions configuring the deformation allowing part 13 and the deformation allowing part 23 may be formed slightly thinner than the other portions.

The configuration of the weak part 18 and the weak part 28 in the embodiment described above is an example, and various modes can be adopted as long as such parts have a lower rigidity than the other portions in the attachment/securing part 16 and the attachment/securing part 26. For example, a plate thickness of portions configuring the weak part 18 and the weak part 28 may be formed slightly thinner than the other portions.

Furthermore, in the embodiment described above, the present disclosure is applied to the vehicle operation pedal device (e.g., brake pedal device 1) having a configuration in which the operation pedal and the intermediate lever are pivotally arranged by the pedal bracket and the operation pedal and the intermediate lever are coupled with the coupling link, but this mode is not the sole case. For example, the present disclosure can be applied to a vehicle operation pedal device in which only the operation pedal is pivotally held and the output member is displaced by the pivoting of the operation pedal as long as the pedal bracket is secured with respect to the vehicle front side and fastened and secured with respect to the vehicle body side member on the vehicle rear side at one location. In this case, the deformation allowing part in the pedal bracket is formed between the pivot shaft of the operation pedal and the attachment/securing part with respect to the vehicle body side member on the vehicle rear side, and effects similar to the brake pedal device 1 according to the embodiment described above can be exhibited.

In the embodiment described above, the present disclosure is applied to the brake pedal device 1 for a service brake, but can be appropriately applied to a vehicle operation pedal device used for some kind of operation on the vehicle.

Furthermore, the shape of the configuring member can be appropriately changed as long as each operation in the vehicle operation pedal device according to the present disclosure can be realized. The shape of each configuring member is not limited to the shape of each configuring member of the brake pedal device 1 in the embodiment described above, and for example, the shape of each configuring member may be changed to avoid interference between the configuring members.

The following description is the list of aspects of the embodiments of the present application.

The first vehicle operation pedal device is a vehicle operation pedal device including: a pedal bracket secured to a dash panel on a vehicle front side; an operation pedal that is pivotally arranged by a first support shaft of the pedal bracket, and that includes a depressing part used for a depressing operation toward the vehicle front side; an intermediate lever that is pivotally supported around a second support shaft arranged parallel to the first support shaft with respect to the pedal bracket, and that displaces a predetermined output member toward the vehicle front side by pivoting in an output direction with the second support shaft as a center; and a coupling link that couples the operation pedal and the intermediate lever, and that pivots the intermediate lever in the output direction in cooperation with the depressing operation on the operation pedal; wherein the pedal bracket includes a pair of side plates secured to the dash panel and arranged at interval in a vehicle width direction, and is fastened and secured with respect to a vehicle body side member located on a vehicle rear side than the dash panel at one location; and the pair of side plates including a deformation allowing part that is a lower rigidity than other portions of the side plate, wherein the deformation allowing part is formed between an attachment/securing part where the pedal bracket is fastened and secured with respect to the vehicle body side member and the support shaft located on the vehicle rear side among the first support shaft and the second support shaft.

The first vehicle operation pedal device includes the pedal bracket, the operation pedal, the intermediate lever, and the coupling link, where the intermediate lever can be pivoted through the coupling link in cooperation with the pivoting of the operation pedal involved in the depressing operation, and the predetermined output member can be displaced toward the vehicle front side. In the vehicle operation pedal device, the pedal bracket includes the pair of side plates secured to the dash panel and arranged at interval in the vehicle width direction, and is fastened and secured with respect to the vehicle body side member located on the vehicle rear side at one location. The pair of side plates includes the deformation allowing part that is a lower rigidity than other portions in the side plate. The deformation allowing part is formed between the support shaft located on the vehicle rear side among the first support shaft and the second support shaft, and an attachment/securing part. Therefore, according to the vehicle operation pedal device, even if a positional relationship of an attachment position of the pedal bracket with respect to the dash panel and an attachment position of the pedal bracket with respect to the vehicle body side member is shifted from an appropriate position, the shift can be absorbed by a deformation at the deformation allowing part of each side plate. Furthermore, since the deformation allowing part is formed between the support shaft located on the vehicle rear side among the first support shaft and the second support shaft, and the attachment/securing part, a portion on the vehicle front side (i.e., portion where first support shaft and second support shaft are located) than the deformation allowing part can maintain an appropriate state, by absorbing the shift by the deformation of the deformation allowing part. Thus, a periphery of the first support shaft and the second support shaft becomes an appropriate state, whereby the vehicle operation pedal device can realize a normal operation of the operation pedal and the intermediate lever even if the positional relationship of the attachment position of the pedal bracket with respect to the dash panel and the attachment position of the pedal bracket with respect to the vehicle body side member is shifted from the appropriate position.

The second vehicle operation pedal device is the first vehicle operation pedal device, wherein the pair of side plates include, a flange part that is formed along an end edge extending in a front and rear direction of the vehicle and that projects out in a direction of intersecting a plate surface of the side plate, and a cutout part formed by cutting out a portion adjacent to the flange part among the end edge of the side plate extending along the front and rear direction of the vehicle; and the deformation allowing part is configured to include a portion where the flange part and the cutout part are adjacent to each other.

In the second vehicle operation pedal device, the flange part is formed along the end edge extending in the front and rear direction of the vehicle in the pair of side plates and projected out in the direction of intersecting the plate surface of the side plate, and thus can enhance the rigidity of the side plate. The cutout part is formed by cutting out the portion adjacent to the flange part among the end edge of the side plate extending along the front and rear direction of the vehicle in the pair of side plates, and thus the rigidity thereof in the side plate becomes the lowest. The deformation allowing part in the pair of side plates is configured to include a portion where the flange part and the cutout part are adjacent, and thus includes the portion where a difference in rigidity in the side plate is large. Therefore, according to the vehicle operation pedal device, the deformation at the deformation allowing part can be generated with the portion where the flange part and the cutout part are adjacent as a center, and the shift can be more reliably absorbed.

The third vehicle operation pedal device is the first vehicle operation pedal device or the second vehicle operation pedal device, wherein the attachment/securing part includes, a fastening part used for fastening and securing of the pedal bracket with respect to the vehicle body side member, and a weak part that is located on the both sides in the vehicle width direction with respect to the fastening part, and that is a lower rigidity than other portions in the attachment/securing part.

In the third vehicle operation pedal device, the attachment/securing part is configured to include the fastening part and the weak part, where the weak part is located on the both sides in the vehicle width direction with respect to the fastening part, and is formed to have a lower rigidity than other portions in the attachment/securing part. Therefore, according to the vehicle operation pedal device, the position of the fastening part with respect to the attachment/securing part in the front and rear direction of the vehicle can be changed by deforming the weak part. Thus, even if a shift in the front and rear direction of the vehicle occurs, the vehicle operation pedal device can absorb the shift in the front and rear direction of the vehicle by deforming the weak part, and can enable attachment and securing to an appropriate position in the dash panel and the vehicle body side member and suppress the lowering in a positional precision related to the depressing part of the operation pedal.

The fourth vehicle operation pedal device is any one of the first vehicle operation pedal device to the third vehicle operation pedal device, wherein the pedal bracket is configured by jointly fastening the attachment/securing part formed by fold processing a vehicle rearward side of one of the pair of side plates, and the attachment/securing part formed by fold processing a vehicle rearward side of the other one of the pair of side plates with respect to the vehicle body side member.

According to the fourth vehicle operation pedal device, even when jointly fastening, and fastening and securing the pair of side plates configuring the pedal bracket with respect to the vehicle body side member, the shift between the attachment position of the pedal bracket with respect to the dash panel and the attachment position of the pedal bracket with respect to the vehicle body side member can be absorbed by the deformation of each deformation allowing part, and the normal operation of the operation pedal and the intermediate lever can be realized.

The present disclosure includes the pedal bracket, the operation pedal, the intermediate lever, and the coupling link, where the intermediate lever can be pivoted through the coupling link in cooperation with the pivoting of the operation pedal involved in the depressing operation, and the output member can be displaced toward the vehicle front side. The pedal bracket includes the pair of side plates secured to the dash panel and arranged at interval in the vehicle width direction, and is fastened and secured with respect to the vehicle body side member located on the vehicle rear side at one location. The pair of side plates include the deformation allowing part having a lower rigidity than other portions in the side plate between the support shaft located on the vehicle rear side among the first support shaft and the second support shaft and the attachment/securing part, and even if the positional relationship of the attachment position of the pedal bracket with respect to the dash panel and the attachment position of the pedal bracket with respect to the vehicle body side member is shifted from the appropriate position, the shift can be absorbed by the deformation at the deformation allowing part of each side plate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A vehicle operation pedal device comprising:
   a pedal bracket secured to a dash panel on a vehicle front side;
   an operation pedal that is pivotally arranged by a first support shaft of the pedal bracket, and that includes a depressing part used for a depressing operation toward the vehicle front side;
   an intermediate lever that is pivotally supported around a second support shaft arranged parallel to the first support shaft with respect to the pedal bracket, and that displaces a predetermined output member toward the vehicle front side by pivoting in an output direction with the second support shaft as a center; and
   a coupling link that couples the operation pedal and the intermediate lever, and that pivots the intermediate lever in the output direction in cooperation with the depressing operation on the operation pedal; wherein
   the pedal bracket includes a pair of side plates secured to the dash panel and arranged at interval in a vehicle width direction, and is fastened and secured with respect to a vehicle body side member located on a vehicle rear side than the dash panel at one location; and the pair of side plates including a deformation allowing part that is a lower rigidity than other portions of the side plate, wherein the deformation allowing part is formed between an attachment/securing part where the pedal bracket is fastened and secured with respect to the vehicle body side member and the support shaft located on the vehicle rear side among the first support shaft and the second support shaft.

2. The vehicle operation pedal device according to claim 1, wherein
the pair of side plates include,
   a flange part that is formed along an end edge extending in a front and rear direction of the vehicle and that projects out in a direction of intersecting a plate surface of the side plate, and
   a cutout part formed by cutting out a portion adjacent to the flange part among the end edge of the side plate extending along the front and rear direction of the vehicle; and
the deformation allowing part is configured to include a portion where the flange part and the cutout part are adjacent to each other.

3. The vehicle operation pedal device according to claim 1, wherein
the attachment/securing part includes,
   a fastening part used for fastening and securing of the pedal bracket with respect to the vehicle body side member, and
   a weak part that is located on both sides in the vehicle width direction with respect to the fastening part, and that is a lower rigidity than other portions in the attachment/securing part.

4. The vehicle operation pedal device according to claim 2, wherein
the attachment/securing part includes,
   a fastening part used for fastening and securing of the pedal bracket with respect to the vehicle body side member, and
   a weak part that is located on both sides in the vehicle width direction with respect to the fastening part, and that is a lower rigidity than other portions in the attachment/securing part.

5. The vehicle operation pedal device according to claim 1, wherein the pedal bracket is configured by jointly fastening the attachment/securing part formed by fold processing a vehicle rearward side of one of the pair of side plates, and the attachment/securing part formed by fold processing a vehicle rearward side of the other one of the pair of side plates with respect to the vehicle body side member.

6. The vehicle operation pedal device according to claim 2, wherein the pedal bracket is configured by jointly fastening the attachment/securing part formed by fold processing a vehicle rearward side of one of the pair of side plates, and the attachment/securing part formed by fold processing a vehicle rearward side of the other one of the pair of side plates with respect to the vehicle body side member.

7. The vehicle operation pedal device according to claim 3, wherein the pedal bracket is configured by jointly fastening the attachment/securing part formed by fold processing a vehicle rearward side of one of the pair of side plates, and the attachment/securing part formed by fold processing a vehicle rearward side of the other one of the pair of side plates with respect to the vehicle body side member.

8. The vehicle operation pedal device according to claim 4, wherein the pedal bracket is configured by jointly fastening the attachment/securing part formed by fold processing a vehicle rearward side of one of the pair of side plates, and the attachment/securing part formed by fold processing a vehicle rearward side of the other one of the pair of side plates with respect to the vehicle body side member.

* * * * *